I. P. WARNER.
CARPET-STRETCHER.
No. 7,072. Reissued April 18, 1876.
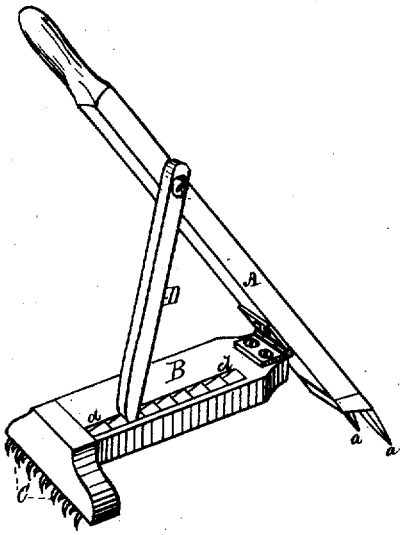
WITNESSES:
Julius Wilcke
N. H. Sherburne,
INVENTOR:
Ira P. Warner
By Gridley & Sherburne
Attys
N. PETERS, PHOTO-LITHOGRAPHER, WASHINGTON, D. C.

UNITED STATES PATENT OFFICE.

IRA P. WARNER, OF MARENGO, ILLINOIS, ASSIGNOR, BY MESNE ASSIGNMENTS, TO HIRAM DRULINER, OF LA PORTE, INDIANA; SAID DRULINER ASSIGNOR TO ROYAL MORRIS, OF CHICAGO, ILLINOIS.

IMPROVEMENT IN CARPET-STRETCHERS.

Specification forming part of Letters Patent No. 67,690, dated August 13, 1867; reissue No. 7,072, dated April 18, 1876; application filed March 16, 1876.

*To all whom it may concern:*

Be it known that I, IRA P. WARNER, of Marengo, in the county of McHenry and State of Illinois, have invented certain new and useful Improvements in Carpet-Stretchers; and I do hereby declare the following to be a full, clear, and exact description thereof, which will enable others skilled in the art to which my invention appertains to make and use the same, reference being had to the accompanying drawing, forming part of this specification, in which the figure represents a perspective view of a carpet-stretcher embodying my invention.

The object of my invention is to provide a device by means of which a carpet, after one of its edges has been tacked to the floor, can be perfectly and easily stretched and firmly held until its opposite edge is tacked to the floor; and my invention consists in the combination with a lever, provided with points at its lower end and adapted to enter the floor, of a base hinged to the lever and provided with hooks or teeth so adjusted as to take into the carpet, whereby the carpet is stretched by the application of force to the lever; also, in the combination with the base and lever of a pawl and ratchet so adjusted as to hold the carpet, under the strain of the lever, during the act of tacking the loose edge thereof to the floor.

In the drawing, A represents the lever, which is made of any suitable material and of any convenient length, and is provided at its lower end with one or more points, *a*, so as to admit of being inserted into the floor, and so as to hold the lower end of the lever in a fixed position, when force is applied to its upper end.

B is the base, which is also made of any suitable material and of any convenient size, and is hinged at one end to the lever A, and is provided at its opposite end with a series of pointed hooks or teeth, C, adapted to take into the carpet in such a manner as to connect the base thereto, and so as to prevent the base from being moved independently of the carpet.

D is a pawl, which is pivoted at its upper end to the lever and above the base B, and is so adjusted as to allow its lower end to engage with or take into the ratchet-teeth *d* on the upper surface of the base, and thereby prevent the base from being drawn back by the contraction of the carpet.

The operation of my said device is as follows: After one edge of the carpet has been tacked to the floor, point *a* of the lever is inserted into the floor on the side of the room opposite to the edge of the carpet tacked to the floor, and the base B placed upon the loose part of the carpet, with the upper end of the lever inclining forward. Power is then applied to the upper end of the lever, and so as to move the lever from the base and until the carpet is properly stretched, when the pawl, if desired, takes into the ratchet-teeth, and thereby retains the strain of the carpet until properly tacked. When two persons are engaged in operating my said device, one in operating the lever and stretching the carpet and the other in tacking down the carpet, the pawl and ratchet are not essential to the working of my said device.

Having thus described my invention, what I claim is—

1. The lever A, provided with one or more points, *a*, in combination with the base B, provided with the hooks or teeth C, substantially as and for the purpose specified.

2. In combination with the lever A and base B, the pawl D and ratchet *d*, substantially as and for the purpose specified.

IRA P. WARNER.

Witnesses:
N. C. GRIDLEY,
JULIUS WILCKES.